(12) United States Patent
Steinwender et al.

(10) Patent No.: US 8,157,689 B2
(45) Date of Patent: Apr. 17, 2012

(54) TORQUE TRANSMISSION UNIT

(75) Inventors: Herbert Steinwender, Raaba (AT); Franz Gratzer, Stallhofen (AT); Gerald Schober, Langegg bei Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 240 days.

(21) Appl. No.: 12/513,180

(22) PCT Filed: Nov. 2, 2007

(86) PCT No.: PCT/EP2007/009535
§ 371 (c)(1),
(2), (4) Date: Jan. 22, 2010

(87) PCT Pub. No.: WO2008/052800
PCT Pub. Date: May 8, 2008

(65) Prior Publication Data
US 2010/0167864 A1 Jul. 1, 2010

(30) Foreign Application Priority Data
Nov. 3, 2006 (DE) .......................... 10 2006 051 997

(51) Int. Cl.
*F16H 48/06* (2006.01)
*F16H 3/44* (2006.01)
(52) U.S. Cl. ........................................ 475/154; 475/311
(58) Field of Classification Search .................. 475/154, 475/311
See application file for complete search history.

(56) References Cited

U.S. PATENT DOCUMENTS

| | | | |
|---|---|---|---|
| 1,049,577 A * | 1/1913 | Halma | 475/154 |
| 4,718,301 A | 1/1988 | Friedrich | |
| 4,729,262 A | 3/1988 | Lanzer | |
| 5,322,484 A | 6/1994 | Reuter | |
| 5,896,956 A | 4/1999 | Lin et al. | |
| 5,997,429 A * | 12/1999 | Raghavan et al. | 475/280 |
| 6,102,827 A | 8/2000 | Teasdale et al. | |
| 6,334,832 B1 | 1/2002 | Heravi et al. | |
| 6,712,730 B2 | 3/2004 | Gradu | |

(Continued)

FOREIGN PATENT DOCUMENTS

AT 008 549 U1 9/2006

(Continued)

*Primary Examiner* — Edwin A Young
(74) *Attorney, Agent, or Firm* — Harness, Dickey & Pierce, P.L.C.

(57) ABSTRACT

The invention relates to a torque transmission unit for a motor vehicle with a permanently driven primary axle and a switchable secondary axle, comprising a first connecting part and a second connecting part. The invention furthermore comprises several lamellas that are divided into primary lamellas and secondary lamellas in an alternating arrangement. The unit further comprises a planetary gear system, comprising an at least first gear element, rotationally connected with the first connection part, a second gear element, rotationally connected with the second connection part, and a third gear element, rotationally connected with the primary lamellas. The secondary lamellas are rotationally connected with the first connection part, the second connection part or with a stationary housing part. The torque transmission unit further comprises at least one electric coil for producing a magnetic field, acting on a magnetorheoplogical medium, wherein each primary lamella and secondary lamella is surrounded at least on two sides by the magnetorheological medium. The planetary gear system induces a torque of the primary lamellas into acceleration with a turning movement of the second connecting part in relation to the first connecting part.

22 Claims, 6 Drawing Sheets

U.S. PATENT DOCUMENTS

| | | | |
|---|---|---|---|
| 2003/0134707 A1* | 7/2003 | Goldie et al. | 475/149 |
| 2003/0144109 A1 | 7/2003 | Gradu | |
| 2005/0252744 A1* | 11/2005 | Steinwender | 192/21.5 |
| 2006/0237959 A1 | 10/2006 | Dimig et al. | |

FOREIGN PATENT DOCUMENTS

| | | |
|---|---|---|
| DE | 3612189 A1 | 10/1987 |
| DE | 43 43 048 B4 | 6/1994 |
| DE | 100 15 769 A1 | 5/2001 |
| DE | 100 29 227 | 12/2001 |
| EP | 0 178 078 | 4/1986 |
| EP | 0 332 608 | 9/1989 |
| EP | 0 356 145 | 2/1990 |
| EP | 0 768 442 A2 | 4/1997 |
| GB | 2 385 100 | 8/2003 |
| WO | 95/24537 | 9/1995 |
| WO | 2005/106275 | 11/2005 |

* cited by examiner

TORQUE TRANSMISSION UNIT

CROSS-REFERENCE TO RELATED APPLICATIONS

This application is a 371 U.S. National Stage of International Application No. PCT/EP2007/009535, filed Nov. 2, 2007, which claims priority to German Patent Application DE 10 2006 051 997.3, filed Nov. 3, 2006. The disclosures of the above applications are incorporated herein by reference.

The invention relates to a torque transmission unit for a motor vehicle having a permanently driven primary axle and a secondary axle capable of being switched in addition thereto. Such a torque transmission unit has a first connection part and a second connection part which are rotatable relative to one another, with the first connection part being provided for the direct or indirect connection to a drive unit of the motor vehicle and with the second connection part being provided for the direct or indirect connection to the secondary axle of the motor vehicle, or vice versa. The torque transmission unit thus serves for the transmission of a portion of the drive torque to the secondary axle. The named first connection part and second connection part can be a drive shaft and an output shaft, or vice versa. Such a torque transmission unit can in particular be part of a transfer case with an integrated offset drive, i.e. with one input shaft and two output shafts.

Such a torque transmission unit can be equipped with a magnetorheological clutch and a planetary transmission. The magnetorheological clutch has at least one electric coil for the generation of a magnetic field which acts on an associated magnetorheological medium. The magnetorheological medium is, for example, magnetic powder—that is magnetizable particles—which is in particular suspended in a liquid to form a magnetorheological fluid. The magnetic powder solidifies or the viscosity of the suspension increases by application of a magnetic field.

The named planetary transmission has at least one first transmission element which is rotationally fixedly connected to the first connection part, a second transmission element which is rotationally fixedly connected to the second connection part and a third transmission element which cooperates with the magnetorheological clutch. The planetary transmission thus ultimately acts as a differential gear, with a rotational movement of the second connection part relative to the first connection part effecting a rotational movement of the third transmission element which cooperates with the magnetorheological clutch. A rotational movement of the second connection part relative to the first connection part of the torque transmission unit can thus be influenced by means of the magnetorheological clutch. The torque transmission onto the secondary axles can therefore hereby be influenced. For this purpose, a magnetic field which acts on the magnetorheological medium is generated by a corresponding current feed of the electric coil.

In known torque transmission units of this type, the magnetorheological clutch used admittedly satisfies the demands with respect to the required clutch torque when the magnetorheological clutch is dimensioned accordingly. Depending on the application or depending on the required clutch torque, the constructional size and the weight of the torque transmission unit—and in particular of the magnetorheological clutch—are, however, undesirably large. A small constructional size is desired for many applications, in particular in the radial direction—relative to the axis of rotation of the torque transmission unit.

It is an object of the invention to provide a torque transmission unit of the explained kind with an improved power-to-weight ratio, that is with a reduced ratio of the weight of the arrangement to the maximum possible clutch torque. In addition, the torque transmission unit should have a construction size which is as small as possible, in particular in the radial direction.

This object is satisfied by a torque transmission unit having the features of claim 1.

The torque transmission unit therefore has a plurality of disks which are subdivided in an alternating arrangement into primary disks and secondary disks, with each of the primary disks and the secondary disks being surrounded by the magnetorheological medium, i.e. being areally in contact with the magnetorheological medium, at least two sides. A multiple of the effective surface thus results with respect to arrangements in which a single working space with magnetorheological medium is provided. The primary disks are rotationally fixedly connected to the named third transmission element of the planetary transmission, in particular to a sun gear, as will be explained in the following. The secondary disks are rotationally fixedly connected to the first connection part, to the second connection part or to a stationary housing part of the torque transmission unit. The primary disks and the secondary disks can be made with thin walls. In this manner, the electric coil, the magnetorheological medium and the primary disks and the secondary disks form a magnetorheological clutch which has a high torque capacity with a small construction size and a low weight.

The fact that the planetary transmission is made such that a rotational movement of the second connection part (e.g. output shaft) relative to the first connection part (e.g. drive shaft) effects a rotational movement of the primary disks connected to the third transmission element with a speed increasing gear ratio (increase in speed) also contributes to this. The clutch torque to be applied by the magnetorheological clutch hereby decreases in accordance with the increase in the speed of the third transmission element relative to the speed difference between the first and second connection parts of the torque transmission unit.

A particularly favorable power-to-weight ratio of the transmission arrangement thus results overall. The required clutch torque can also be achieved with a low radial extent (with respect to the axis of rotation of the torque transmission unit). The axial extent of the torque transmission unit can also be kept low since it is possible to dispense with additional electric coils in many applications.

In accordance with an advantageous embodiment, the primary disks and the secondary disks of the magnetorheological clutch have a respective hollow cylindrical section which is arranged coaxially to the axis of rotation of the torque transmission unit and which is surrounded by the magnetorheological medium at the respective inner side and outer side. These hollow cylindrical sections are therefore arranged nested into one another in the radial direction. Depending on the axial extent of the primary disks and of the secondary disks—high clutch torques can hereby be realized with a small radial construction size of the torque transmission unit.

In accordance with a particularly advantageous embodiment, each of the primary disks and of the secondary disks is made as a so-called pot disk which has a radial section and a hollow cylindrical axial section, as explained above. The radial section extends in the radial direction with respect to the axis of rotation of the torque transmission unit. The hollow cylindrical axial section is adjacent to the respective radial section and is arranged coaxially to the axis of rotation of the torque transmission unit. The radial sections of at least the primary disks (which are rotationally fixedly connected to the named third transmission element) are directed radially inwardly. The radial sections of the secondary disks can be directed radially inwardly and outwardly.

High clutch torques can also be achieved here with a small radial construction size, with additionally a simple and space-saving fastening of the alternatingly arranged pot disks being possible, for example via a spline at the respective radial section of the disks.

It is preferred for this embodiment if the working spaces for the magnetorheological medium are radially inwardly closed by means of a closure device extending in the axial direction adjacent to a transition region between the respective radial section and the respective axial section of the primary disks or of the secondary disks so that substantially cylindrical working spaces are formed in which the magnetorheological medium is received. Any unwanted demixing of the magnetorheological medium due to centrifugal forces is prevented by these cylindrical working spaces which thus extend coaxially to the axis of rotation of the torque transmission unit. Nevertheless, openings can be provided at the transition region between the respective radial section and the axial section of the respective disk, for example for the filling of the working spaces or for leveling.

The named closure device can be realized particularly simply by a plastic rig which is injection molded to the radial sections of the primary disks or of the secondary disks. In this respect, a plurality of such plastic rings can also be provided, for example injection molded from two axial sides. Other types of closure devices are also possible, for example metal rings.

The named radial sections of the primary disks or secondary disks are arranged adjacent to one another in the axial direction with respect to the axis of rotation of the torque transmission unit. To ensure a simple and effective sealing of the working spaces for the magnetorheological medium, it is preferred if sealing rings are arranged at a radially outer peripheral side of the named closure device (again with respect to the axis of rotation of the torque transmission unit), and indeed in each case one respective sealing ring on both sides of the axial arrangement of the radial sections of the disks.

It is in this respect particularly advantageous if the sealing rings are arranged radially inside the explained cylindrical working spaces for the magnetorheological medium—and in particular radially inside the innermost working space—with respect to the axis of rotation of the torque transmission unit. It is hereby namely ensured that the sealing rings are not loaded by the centrifugal forces acting on the magnetorheological medium.

It is additionally of advantage with respect to the explained embodiment with pot disks if the radial sections of the primary disks are rotationally fixedly connected to the third transmission element of the planetary transmission via a respective spline (directly or via an intermediate element), with the respective spline being provided radially inside the named closure device. The closure device thus only has to satisfy a sealing function, whereas the forces occurring in the peripheral direction are taken up by the spline.

It is furthermore preferred with respect to the explained embodiment with pot disks if the planetary transmission is arranged in axial extension of the primary disks and the secondary disks, in particular adjacent to the radial sections of the primary disks, with respect to the axis of rotation of the torque transmission unit. This likewise contributes to a slim construction shape, that is with a small radial extent.

It is generally possible to use clutch disks having a design of substantially ring disk shape alternatively to the named cup disks.

In accordance with a further advantageous embodiment of the torque transmission unit in accordance with the invention, the electric coil is arranged at a stationary housing part of the torque transmission unit, for example at a cover section. No sliding contacts are thus required to supply the coil with electrical current. The generated magnetic field can nevertheless act on the magnetorheological medium.

As regards the planetary transmission of the torque transmission unit, the third transmission element, which is rotationally fixedly connected to the primary disks of the magnetorheological clutch, is preferably a sun gear. An ideal ratio of the respective effective radii of the disk and the associated transmission element of the planetary transmission is hereby achieved. The sun gear is namely that part of the planetary transmission which has—with respect to the axis of the planetary transmission—the smallest effective radius (radius of the toothed arrangement of the sun gear with the planet gears). With a radius of the rotatable disk which is larger in this respect, a favorable lever ratio is thus possible to assist a torque transmitted by the planetary transmission via the sun gear by means of the magnetorheological clutch.

Further embodiments of the invention are set forth in the dependent claims.

The invention will be described in the following only by way of example with reference to the drawings. Elements which are the same or of the same kind are marked by the same reference numerals therein.

Figure 1:
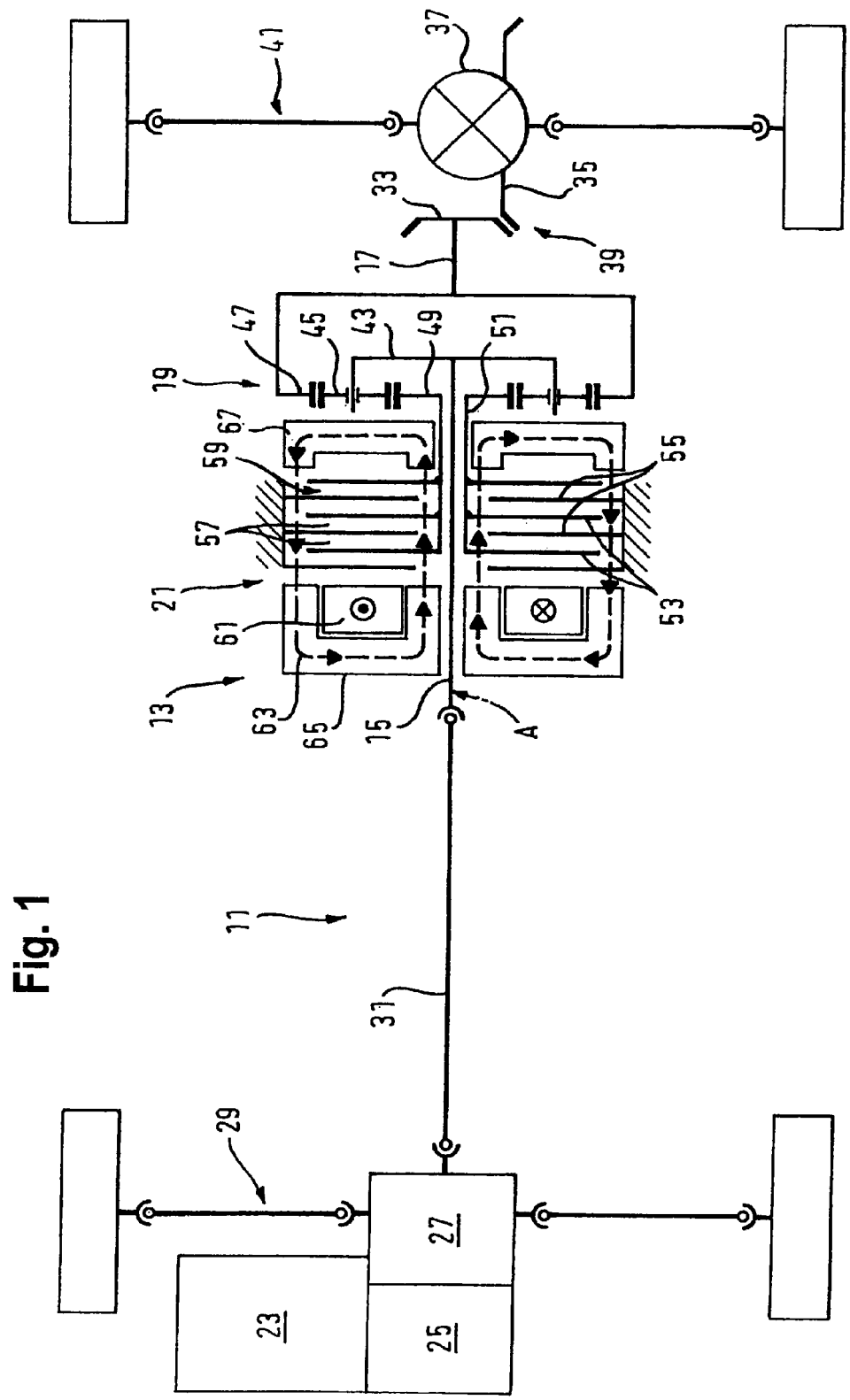
FIG. 1 shows a schematic representation of a first embodiment of a torque transmission unit in accordance with the invention in a powertrain of a motor vehicle.

FIG. 1 shows a transmission arrangement which is configured in a powertrain 11 of a motor vehicle having all-wheel drive capable of being switched in addition as a torque transmission unit 13. The torque transmission unit 13 has a drive shaft 15, an output shaft 17, a planetary transmission 19 coupled with the drive shaft 15 and the output shaft 17 and a magnetorheological clutch 21 which is coupled with the planetary transmission 19 and is configured as a brake here.

The powertrain 11 of the motor vehicle furthermore includes a drive unit 23 (for example an internal combustion engine), a shifting transmission 25 (actuated manually or automatically) coupled therewith and a transfer case 27. The transfer case 27 transmits a driving torque to the wheels of the front axle 29 via a front-axle differential, not shown, said front axle forming the permanently driven vehicle axle in the embodiment shown and therefore being called the primary axle. In addition, the transfer case 27 transfers a portion of the driving torque via a Cardan shaft 31 to the drive shaft 15 of the torque transmission unit 13.

The output shaft 17 of the torque transmission unit 13 is connected to a bevel gear 33 which meshes with a crown wheel 35 of a rear axle differential 37. The bevel gear 33 and the crown wheel 35 together form a differential gear 39 of the transmission arrangement, as will still be explained in the following. The rear axle differential 37 distributes a torque transferred to the crown wheel 35 to the wheels of the rear axle 41 which forms a secondary axle of the motor vehicle in the embodiment shown.

The planetary transmission 19 of the torque transmission unit 13 has a planet carrier 43 which is rotationally fixedly connected to the drive shaft 15 and at which a plurality of planet gears 45 are freely rotatably journaled. Furthermore, the planetary transmission 19 has an annulus gear 47 which is rotationally fixedly connected to the output shaft 17 and which meshes with the planet gears 45. In addition, the planetary transmission 19 has a sun gear 49 which likewise meshes with the planet gears 45. The planet carrier 43, the annulus gear 47 and the sun gear 49 are rotatably journaled with respect to an axis of rotation A.

The sun gear 49 is rotationally fixedly connected via a hollow shaft 51 rotatably journaled at the drive shaft 15 to a plurality of primary disks 53 which form a part of the magnetorheological clutch 21. As can already be seen from the schematic representation in accordance with FIG. 1, the rotatable primary disks 53 have a radius which, with respect to the axis A, is much larger than the effective radius of the toothed arrangement of the sun gear 49 with the planet gears 45. The magnetorheological clutch 21 furthermore has a plurality of secondary disks 55 fixed to the housing. The rotatable primary disks 53 and the secondary disks 55 fixed to the housing are arranged alternatingly so that a respective secondary disk 55 engages into an intermediate space between two adjacent primary disks 53 and a respective primary disk 53 engages into an intermediate space between two adjacent secondary disks 55. A respective working space 57 is formed between two adjacent disks, that is between a primary disk 53 and a secondary disk 55 adjacent thereto, said working space extending in the radial direction here and containing a magnetorheological medium 59, for example a liquid with magnetizable particles suspended therein. The individual working spaces 57 can be coupled with one another. In another respect, the space containing the magnetorheological medium and formed by the plurality of working spaces 57 is sealed, however.

The magnetorheological clutch 21 additionally has an electric coil 61 which is arranged axially adjacent to the disks 53, 55 and coaxially to the axis A. The coil 61 can generate a magnetic field which acts on the magnetorheological medium 59 and hereby in turn causes a mechanical effective connection between the rotatable primary disks 53 and the secondary disks 55 fixed to the housing. An exemplary extent of the field lines 63 of the magnetic field which can be generated by means of the coil 61 is illustrated by dashed arrows. The coil 61 is surrounded by a yoke 65 to amplify the desired field line extent and a yoke 67 is also arranged at the side of the disks 53, 55 remote from the coil 61. It must be noted that in the embodiment shown here not only the secondary disks 55, but also the coil 61, the yoke 65 and the yoke 67 are arranged in a stationary manner.

By application of a magnetic field to the magnetorheological medium 59 as a consequence of a corresponding current feed of the coil 61, the primary disks 53 and the secondary disks 55 can be coupled continuously with friction locking to an increasing degree in order hereby to brake, or finally hold, the sun wheel 49 of the planetary transmission 19. A driving torque is hereby applied to an increasing degree to the rear axle 41 forming the secondary axle, i.e. the rear axle 41 is coupled with the front axle 29.

It is particularly advantageous in this respect if the differential gear 39 formed by the bevel gear 33 and the crown wheel 35 of the rear axle differential 37 has such a gear ratio that—while taking account of the further gear ratios in the powertrain 11—the gear ratio of the planetary transmission 19 is compensated (with a braked sun gear 49). In this case, the sun gear 49 is namely substantially stationary when the front axle 29 and the rear axle 41 rotate at the same speed. The magnetorheological clutch 21 is hereby only exposed to minimal mechanical and thermal loads. Since thus generally no rotational movement of the primary disks 53 takes place, there is also no risk of a demixing of the magnetorheological medium 59 due to centrifugal forces. The disks 53, 55—as shown in FIG. 1—can therefore be made as round disks which extend radially with respect to the axis of rotation A.

A particular advantage of the shown magnetorheological clutch 21 comprises the fact that a plurality of working spaces 57 with magnetorheological medium 59 are formed between the primary disks 53 and the secondary disks 55, with each disk 53, 55 being surrounded at both sides by the magnetorheological medium 59 so that a large effective surface is given for the cooperation of the disks 53, 55 via the magnetorheological medium 59.

Since the primary disks 53 are coupled with the sun gear 49 of the planetary transmission 19, a particularly favorable ratio of the radius of the primary disks 53 to the effective radius of the sun gear 49 results—as already explained. A holding torque to be applied to the sun gear 49 can be generated at the primary disks 53 by a comparatively small friction force due to the favorable lever ratio.

The planetary transmission 19 is configured such that a rotational movement of the drive shaft 15 and of the output shaft 17 relative to one another effects a speed increasing gear ratio with respect to the primary disks 53. This means that only such a clutch torque has to be applied for the braking or holding of the primary disks 53 which is reduced in accordance with the transmission ratio of the planetary transmission 19.

A particular advantage of the torque transmission unit 13 shown furthermore comprises the fact that no sliding contacts are required for the current feed of the coil 61. The coil 61 can rather be arranged fixed to the housing, whereby the structure is simplified.

It must still be noted with respect to the embodiment in accordance with FIG. 1 that the drive shaft 15 does not necessarily have to be connected to the planet carrier 43, but can rather also be coupled with the annulus gear 47, with in this case the output shaft 17 being coupled with the planet carrier 43. This alternative embodiment ultimately corresponds to a mirror swapping of drive and output.

It must furthermore still be noted with respect to the embodiment in accordance with FIG. 1 that the magnetorheological clutch 21 can generally also have a plurality of coils 61, in particular in order to be able to generate comparatively large magnetic fields with a small radial construction size. Such a plurality of coils are preferably arranged coaxially with respect to one another and axially adjacent one another, with primary disks and secondary disks arranged between the respective coils, with two respectively adjacent coils having a current feed in opposite senses.

Figure 2:
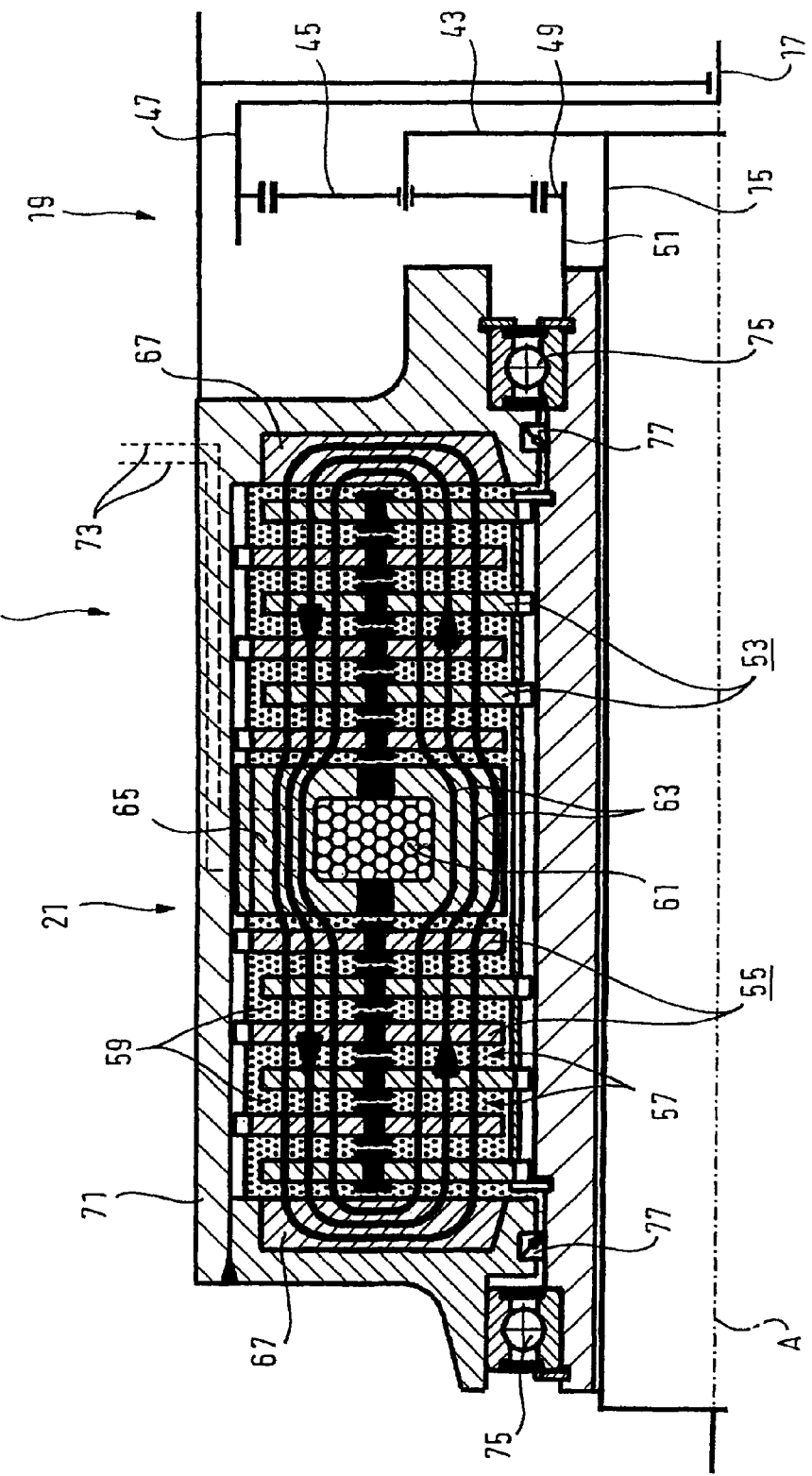
FIG. 2 shows a cross-sectional view of a part of a second embodiment of a torque transmission unit in accordance with the invention.

FIG. 2 shows in a cross-sectional view a half of a torque transmission unit 13 having a planetary transmission 19 and having a magnetorheological clutch 21 in an embodiment in which a coil 61 with a yoke 65 is surrounded with respect to the axial direction of the axis A at both sides of a respective alternating arrangement of primary disks 53 and secondary disks 55 with a respective yoke 67.

The mutually connected working spaces 57 between the primary disks 53 and the secondary disks 55 can be clearly recognized which are filled with magnetorheological medium 59 and can be traversed by field lines 63 of the magnetic field.

A housing 71 of the shown torque transmission unit 13 is additionally shown in FIG. 2. The coil 61 with yoke 65 and electrical terminals 73 as well as the secondary disks 55 are arranged in a stationary manner with respect to this housing 71.

Furthermore, radial bearings 75 are shown in FIG. 2 by means of which the hollow shaft 51 supporting the sun gear 49 and the primary disks 53 is journaled at the housing 71. In addition, seals 77 are shown which prevent an emergence of magnetorheological medium 59 from the working spaces 57.

Figure 3:
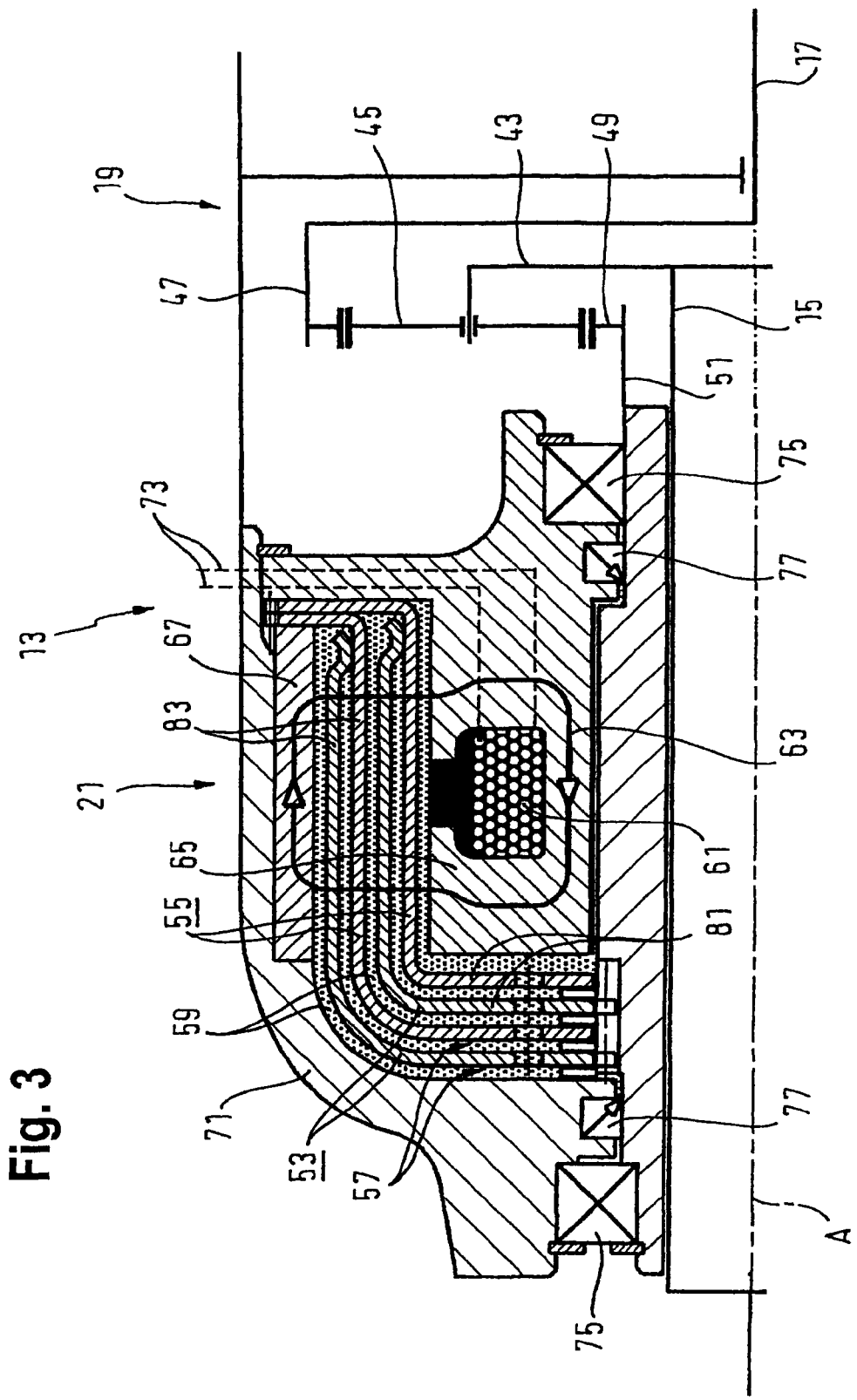
FIG. 3 shows a cross-sectional view of a part of a third embodiment of a torque transmission unit in accordance with the invention.

FIG. 3 shows an embodiment of a torque transmission unit 13 which substantially differs from the embodiment in accordance with FIG. 2 by the design of the disks 53, 55. The primary disks 53 are admittedly still rotatable, and they are for this purpose rotationally fixedly connected to the sun gear 49 via the hollow shaft 51. The secondary disks 55 are also still arranged fixed to the housing. However, the disks 53, 55 are made as pot disks which have a radial section 81 substantially of ring disk shape and a substantially hollow cylindrical axial section 83 adjacent thereto. The disks 53, 55 are connected to one another in a radially outer region of the disks 53, 55—they are the named axial sections 83 here—such that the working spaces 57 are separate from one another. An unwanted demixing of the magnetorheological medium 59 due to centrifugal forces is hereby prevented.

Figure 4:
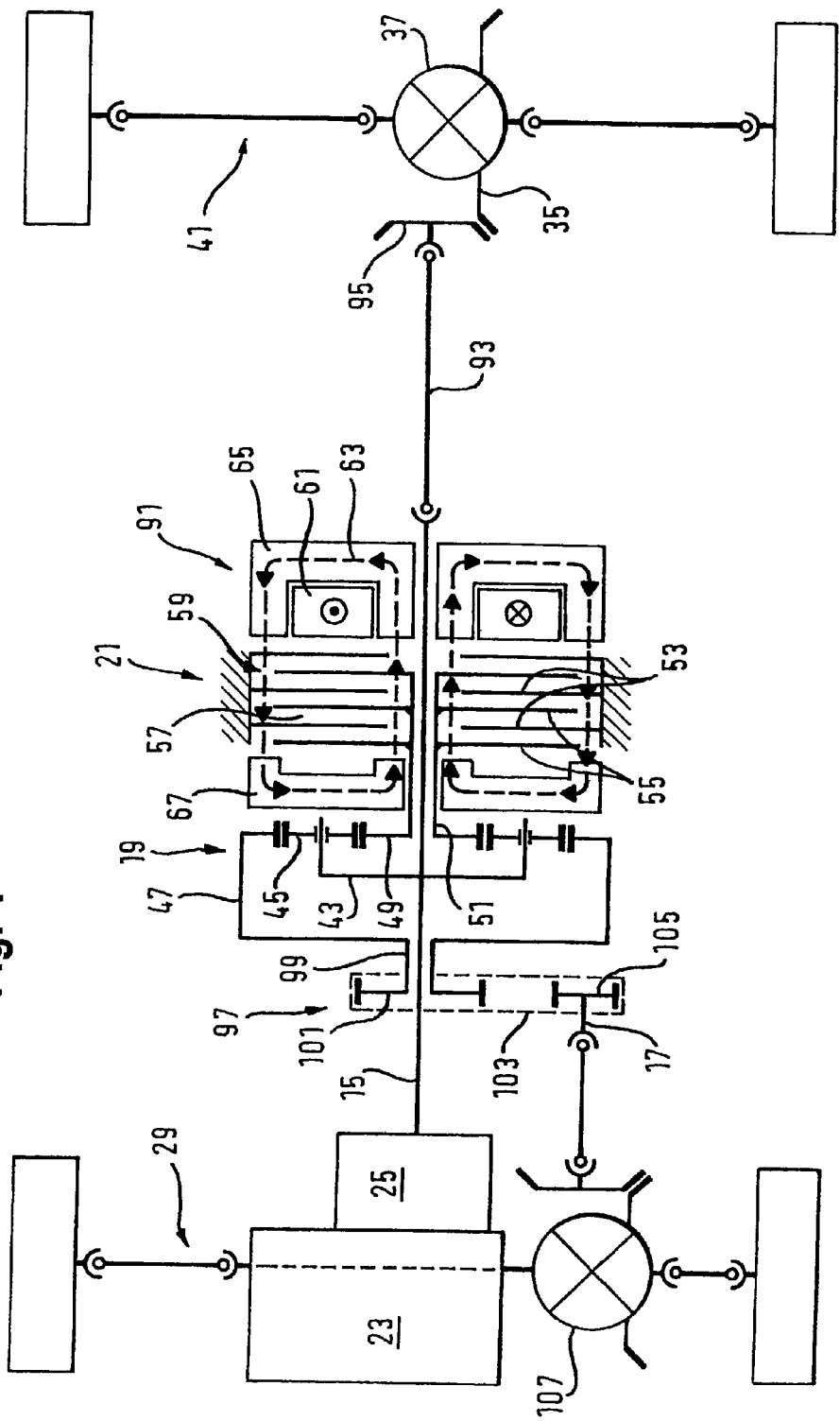
FIG. 4 shows a schematic representation of a fourth embodiment of a torque transmission unit in accordance with the invention in a powertrain of a motor vehicle.

FIG. 4 schematically shows a powertrain 11 of a motor vehicle with all-wheel drive capable of being switched in addition in which a transmissions arrangement in accordance with the invention is made as a transfer case 91.

A drive shaft 15 of the transfer case 91 is also driven here by means of a drive unit 23 and via a shifting transmission 25 and is rotationally fixedly connected to a planet carrier 43 of a planetary transmission 19. The drive shaft 15 simultaneously serves as a through drive shaft which is connected to a bevel gear 95 via a Cardan shaft 93. The bevel gear 95, which is not part of the transfer case 91, meshes with a crown wheel 35 of the rear axle differential 37. The rear axle 41 is thus—since it is permanently driven—the primary axle in the embodiment in accordance with FIG. 4.

As with the embodiment in accordance with FIG. 1, the planet gears 45 rotatably journaled at the planet carrier 43 mesh with a sun gear 49 which is rotationally fixedly connected to a plurality of primary disks 53 via a rotatably journaled hollow shaft 51. Each primary disk 53 encloses with one or two adjacent secondary disks 55 a respective working space 57 which is filled with a magnetorheological medium 59. A magnetic field can be generated in the working spaces 57 by means of at least one current feedable coil 61—and assisted by an associated yoke 65 as well as an oppositely dispose yoke 67—said magnetic field increasing the viscosity of the magnetorheological medium 59 and hereby coupling the primary disks 53 and the secondary disks 55 to one another to brake or hold the sun gear 49.

The named planet gears 45 of the planetary transmission 19 additionally mesh with an annulus gear 47. The annulus gear 47 is here only rotationally operationally connected to the output shaft 17 of the transfer case 91 indirectly, namely via an offset drive 97 of the transfer case 91. For this purpose, the annulus gear 47 is rotationally fixedly coupled with an input gear 101 of the offset drive 97 via a hollow shaft section 99. The input gear 101 is in turn coupled via a chain 103 with an output gear 105 of the offset drive 97, with this output gear 105 being connected to the output shaft 17 of the transfer case 91. Instead of a chain 103, the input gear 101 and the output gear 105 can also be connected to one another via an idler gear or can mesh directly with one another. The output shaft 17 of the transfer case 91 is ultimately coupled with a front axle differential 107 which distributes a drive torque transmitted to the output shaft 17 to the wheels of the front axle 29.

The front axle 29 is selectively continuously coupled with the rear axle 41 by braking or holding the sun gear 49 by means of the magnetorheological clutch 21 of the transfer case 91 in accordance with FIG. 4, with a portion of the driving torque transmitted to the drive shaft 15 by the drive unit 43 via the shifting transmission 25 being supplied to the front axle 29.

A differential gear can also be provided in the embodiment in accordance with FIG. 4 to compensate the gear ratio of the planetary transmission 19 such that, with the same speed of the front axle 29 and of the rear axle 41, the sun gear 49 of the planetary transmission 19 is substantially stationary. Such a differential gear can be realized particularly simply by a corresponding choice of the gear ratio of the offset drive 97 (ratio of the number of teeth of the input gear 101 to the number of teeth of the output gear 105).

The advantages explained in connection with FIG. 1 also apply to the embodiment in accordance with FIG. 4 (large effective surface and large effective radius of the disks 53, 55 for a high power-to-weight ratio; stationary arrangement of the coil 61).

Figure 5A:
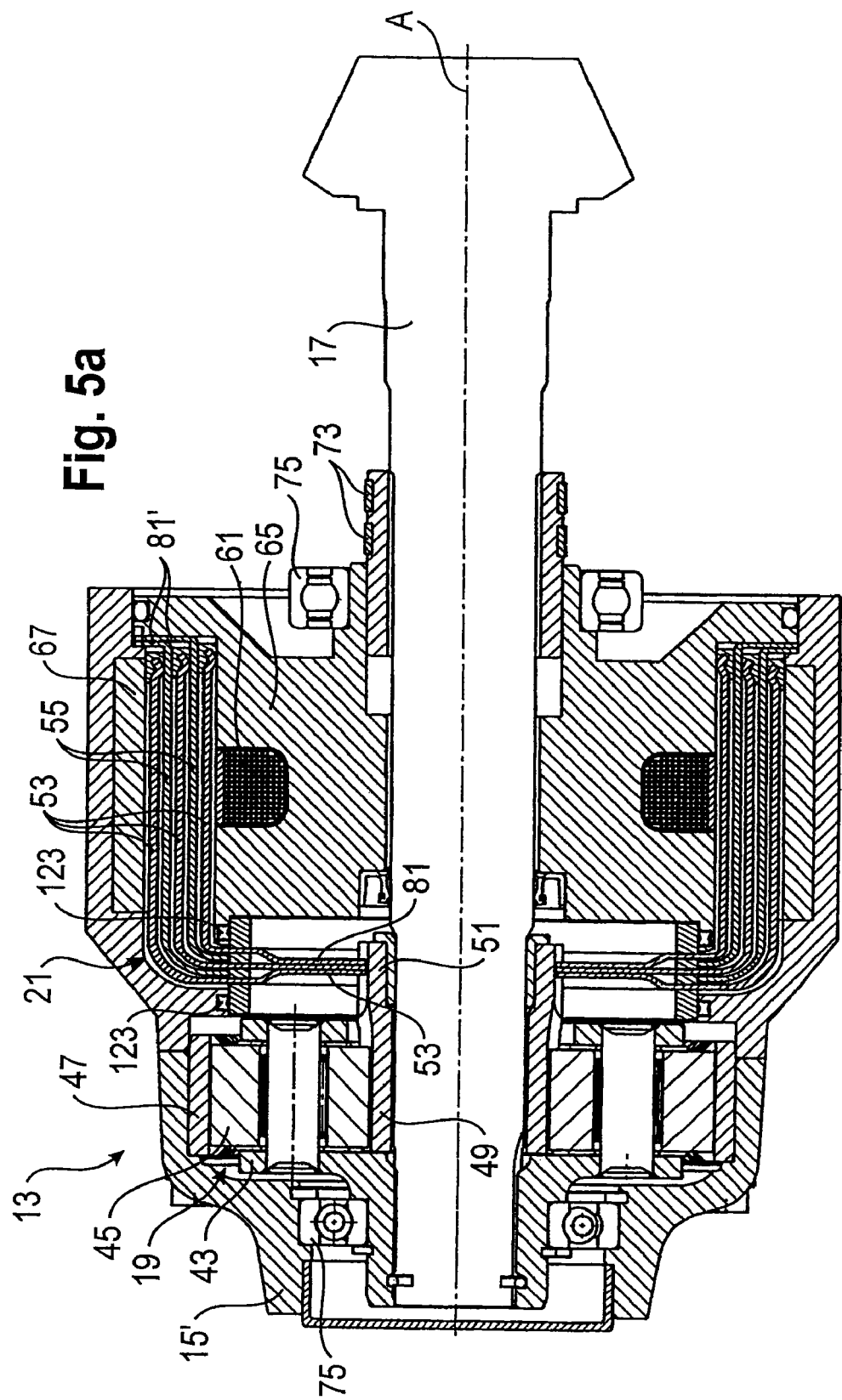
FIG. 5a shows a cross-sectional view of a fifth embodiment of a torque transmission unit in accordance with the invention.
Figure 5B:
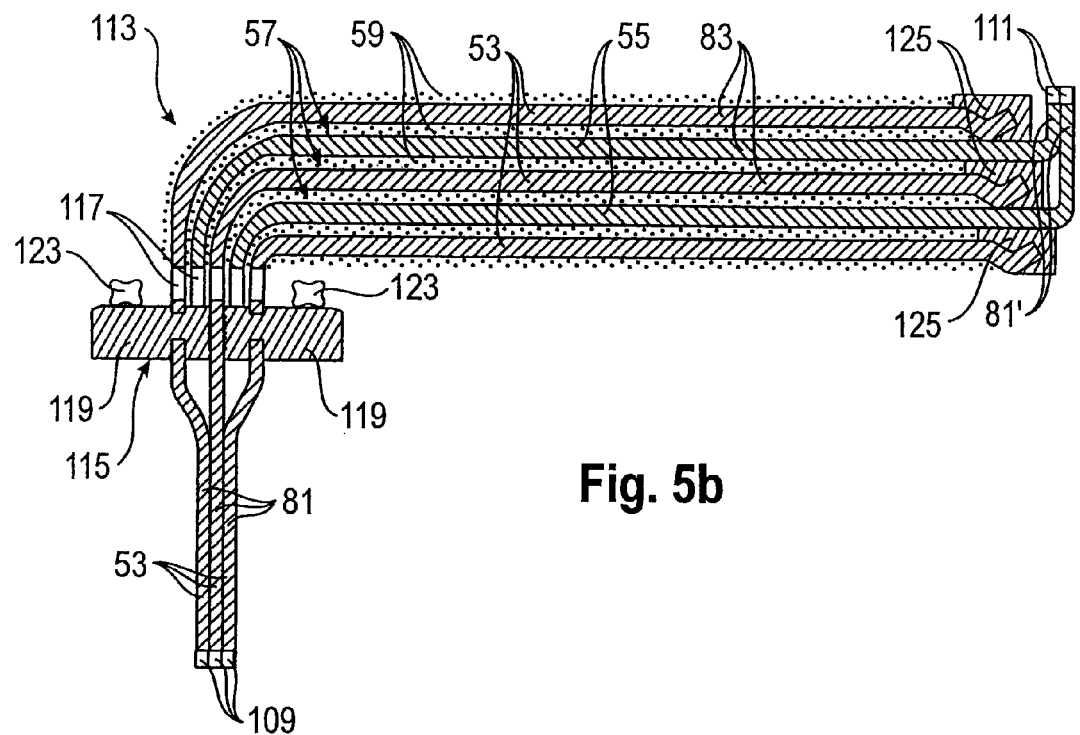
FIGS. 5b and 5c show detail views of the fifth embodiment in two different sectional planes.
Figure 5C:
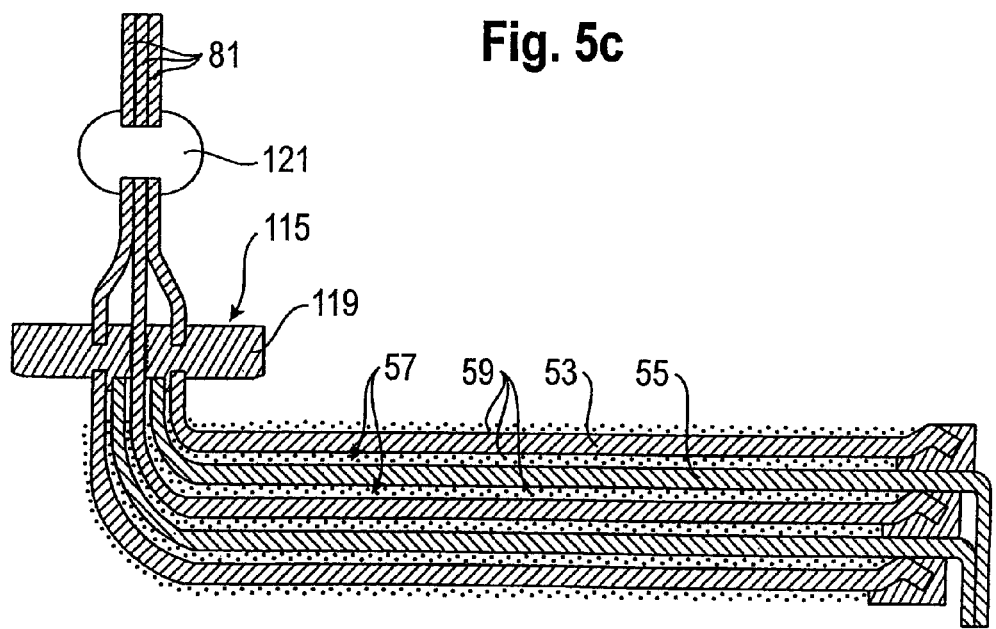

FIG. 5a shows a cross-sectional view of an advantageous further embodiment of a torque transmission unit 13 which can be arranged, for example, as a so-called "hang-on" clutch in the region of one of the vehicle axles—in particular at the respective axle differential. Alternatively to this, the torque transmission unit 13 in accordance with FIG. 5a can, for example, also be used in a transfer case 91, in a similar manner as was explained in connection with FIG. 4. FIGS. 5b and 5c show a respective detail view of parts of the torque transmission unit 13 in accordance with FIG. 5a, and indeed in two different sectional planes.

The torque transmission unit 13 has a rotatably journaled drive housing 15' (as a first connection part) and a rotatably journaled output shaft 17 (as a second connection part). The drive housing 15' and the output shaft 17 are drive-effectively coupled with one another via a planetary transmission 19. An annulus gear 47 is for this purpose rotationally fixedly connected to the drive housing 15'. A planet carrier 43, at which a plurality of planet gears 45 are rotatably journaled, is rotationally fixedly connected to the output shaft 17. The planetary transmission 19 furthermore includes a sun gear 49 which is made in one piece with or is rotationally fixedly connected to a hollow shaft 51, with the sun gear 49 being rotatably journaled with the hollow shaft 51 relative to the drive housing 15' and the output shaft 17.

The torque transmission unit 13 furthermore has a magnetorheological clutch 21. It includes an electric coil 61 with an associated coil core or inner yoke 65 and an outer yoke 67. The electric coil 61, the yoke 65 and the yoke 67 are rotationally fixedly connected to the drive housing 15'. The coil 61 is thus here likewise rotatably journaled. Electrical terminals 73 in the form of sliding contacts are provided to be able to selectively feed current to the coil 61. Alternatively to the illustration shown in FIG. 5a, the electric coil 61 with the yoke 65 can, however, also be arranged in a stationary manner, for example at a cover section arranged in a stationary manner, so that, despite the rotatable journaling of the drive housing 15' and of the output shaft 17, no sliding contacts are required for the current feed of the coil 61, in a similar manner as described in connection with FIGS. 1 to 4.

The magnetorheological clutch 21 furthermore comprises a plurality of primary disks 53 and secondary disks 55 which engage into one another and which are arranged coaxially to the axis of rotation A of the torque transmission unit 13. The primary disks 53 are rotationally fixedly connected via a respective spline 109 (FIG. 5*b*) to the hollow shaft 51 and thus to the sun gear 49 of the planetary transmission 19. The secondary disks 55 are rotationally fixedly connected to the drive housing 15' via a respective spline 111 (FIG. 5*b*). The primary disks 53 and the secondary disks 55 are made as pot disks which have a respective hollow cylindrical axial section 83 and a respective radial section 81 which is adjacent to it and extends radially inwardly, in each case with respect to the axis of rotation A of the torque transmission unit 13. The radial sections 81 are made very short in the secondary disks 55 and they can be made even shorter than is shown in FIGS. 5*b* and 5*c*. However, the secondary disks 55 have radial sections 81' additionally directed radially outwardly at which the already named splines 111 are formed.

A respective working space 57 which is filled with a magnetorheological medium is formed between the axial sections 83 of the primary disks 53 and secondary disks 55 as well as between the axial section 83 of the radially innermost primary disks 53 and the yoke 65 as well as also between the axial section 83 of the radially outermost primary disk 53 and the yoke 67. The working spaces 57 substantially have a cylindrical shape, i.e. they are substantially made as annular clearances. However, the primary disks 53 and the secondary disks 55 naturally have a respective transition region 113 between the respective axial section 83 and the respective radially inwardly directed radial section 81. The working spaces 57 are likewise still filled with the magnetorheological medium 59 along these transition regions 113.

As explained in connection with the aforesaid embodiments, the coil 61 can generate a magnetic field which acts on the magnetorheological medium 59 and hereby in turn causes a mechanical active connection between the rotatable primary disks 53 and the rotatable secondary disks 55. By application of a magnetic field to the magnetorheological medium 59 as a consequence of a corresponding current feed of the coil 61, the primary disks 53 and the secondary disks 55 can therefore be coupled continuously with friction locking to an increasing degree in order hereby to brake, or finally hold, the sun wheel 49 of the planetary transmission 29 relative to the annulus gear 47. A driving torque is hereby transmitted to an increasing degree from the drive housing 15' (which is rotationally fixedly coupled with the annulus gear 47) to the output shaft 17 (which is drive-effectively coupled with the annulus gear 45 and the sun gear 49 via the planet carrier 43). The magnetorheological clutch 21 only has to apply or assist a comparatively small torque with respect to the driving torque hereby transmitted. The planetary transmission 19 is namely configured such that a rotational movement of the output shaft 17 relative to the drive housing 15' effects a rotational movement of the sun gear 49 and thus of the primary disks 53 with a speed increasing gear ratio (increase in the speed). Such a gear ratio (i<1) corresponds to a reduction in the torque which has to be transmitted via the primary disks 53 and the secondary disks 55.

It is also of special advantage in this respect that the primary disks 53 and the secondary disks 55 have—with respect to the axis of rotation A of the torque transmission unit 13—a radial extent which is substantially larger than the effective radius of the sun gear 49 of the planetary transmission 19. In other words, the spacing of the hollow cylindrical axial sections 83 of the disks 53, 55 from the axis of rotation A is substantially larger than the spacing of the toothed arrangement between the sun gear 49 and the planet gears 45 of the planetary transmission 19. A particularly favorable lever ratio hereby results to assist a torque transmitted from the planetary transmission 19 via the sun gear 49 by means of the magnetorheological clutch 21.

Since in addition the axial sections 83 of the primary disks 53 and of the secondary disks 55 are each in contact with the magnetorheological medium 59 both at the inner side and at the inner side and since an alternating arrangement of a plurality of primary disks 53 and secondary disks 55 is provided, the magnetorheological clutch 21 has a particularly large effective surface for the magnetorheological medium 59 so that high clutch torques can also be generated with a small radial extent—that is with a small diameter of the magnetorheological clutch 21. It is thus also sufficient for most applications to use a single electric coil 61. A simple, light and compact structure of the torque transmission unit 13 thus results overall.

Further special features of the torque transmission unit 13 in accordance with FIGS. 5*a* to 5*c* will be explained in the following:

A ring-shaped closure device 115 which closes the working spaces 57 for the magnetorheological medium 59 radially inwardly is arranged adjacent to the already named respective transition region 113 between the axial section 83 and the radial section 81 of the pot disks 53, 55 (FIGS. 5*a* and 5*b*). It is hereby ensured that the working spaces 57 substantially have the already named cylindrical shape, whereby a demixing of the magnetorheological medium 59 due to the centrifugal forces which occur is prevented. It must be noted that the working spaces 57 can be connected to one another via recesses 117 in the radial sections 81 of the disks 53, 55 shown in FIG. 5*b* to enable a filling of the working spaces 57 and a mutual level compensation. It is, however, important that these recesses 117 are arranged radially inside the radially innermost working space 57 so that the named demixing effects are avoided.

In the embodiment shown in FIGS. 5*a* to 5*c*, the named closure device 115 is formed by two plastic rings 119 which are injection molded onto the radial sections 81 of the primary disks 53. In the region of the closure device 115, the radial sections 81 of the primary disks 53 have further openings to enable a material throughflow for the injection molding of the plastic rings 119.

It must be noted that the named closure device 115 only has a sealing function. The torque transmission by means of the primary disks 53—that is the transmission of forces in the peripheral direction—takes place via the already named spline 109 at the free ends of the radial sections 81 of the primary disks 53. A rivet connection 121 is provided at the radial sections 81 to fix the primary disks 53 relative to one another in the axial direction (FIG. 5*c*).

Two sealing rings 123 are arranged at the radially outer peripheral side of the closure device 115, and indeed adjacent to the radial sections 81 of the two axially outermost primary disks 53. Said sealing rings seal the two outermost working spaces 57 which communicate via the recesses 117 with the inner workings spaces 57 for the magnetorheological medium 59 with respect to the closure device 115 (plastic rings 119), on the one hand, and the rotatable drive housing 15' or the associated yoke 65, on the other hand, so that the magnetorheological medium 59 also remains captured in the working spaces 57 when the torque transmission unit 13 is stationary. Since both sealing rings 123 are arranged radially within the radially innermost working spaces 57, the sealing rings 123 are also not loaded with an increased pressure of the magnetorheological medium 59 in the operation of the torque transmission unit 13—that is when the unit rotates—due to the then active centrifugal forces.

The working spaces 57 for the magnetorheological medium 59 are mutually sealed by sealing blocks 125 at the end of the pot disks 53, 55 remote from the closure device 115.

It must still be noted with respect to the torque transmission unit 13 in accordance with FIGS. 5a to 5c that the drive housing 15' is radially outwardly rotatably journaled with respect to a stationary housing not shown in the Figures.

In addition, it is generally also sufficient if only the shown primary disks 53—but not the secondary disks 55—are made with radially inwardly projecting radial sections 81. It is therefore generally sufficient if the secondary disks 55 already end in the region of the recesses 117 shown in FIG. 5b without the secondary disks 55 having to extend up to the closure device 115 (or beyond it).

Finally, it is also possible in the embodiment in accordance with FIGS. 5a to 5c to swap the input (drive housing 15') and the output (output shaft 17).

REFERENCE NUMERAL LIST 11 powertrain
13 torque transmission unit
15 drive shaft
15' drive housing
17 output shaft
19 planetary transmission
21 magnetorheological clutch
23 drive unit
25 shifting transmission
27 transfer case
29 front axle
31 Cardan shaft
33 bevel gear
35 crown wheel
37 rear axle differential
39 differential gear
41 rear axle
43 planet carrier
45 planet gear
47 annulus gear
49 sun gear
51 hollow shaft
53 primary disk
55 secondary disk
57 working space
59 magnetorheological medium
61 electric coil
63 magnetic field line
65 yoke
67 yoke
71 housing
73 electrical terminal
75 radial bearing
77 seal
81 radial section
81' radial section
83 axial section
91 transfer case
93 Cardan shaft
95 bevel gear
97 offset drive
99 hollow shaft section
101 input gear
103 chain
105 output gear
107 front axle differential
109 spline
111 spline
113 transition region
115 closure device
117 recess
119 plastic ring
121 rivet connection
123 seal ring
125 sealing block
A axis of rotation

The invention claimed is:

1. A torque transmission unit for a motor vehicle having a permanently driven primary axle and a secondary axle, comprising:

a first connection part and a second connection part which are rotatable relative to one another, with the first connection part being adapted for the connection to a drive unit of the motor vehicle and the second connection part being adapted for the connection to the secondary axle of the motor vehicle—or vice versa;

furthermore having a plurality of disks which are subdivided in an alternating arrangement into primary disks and secondary disks;

a planetary transmission including at least one first transmission element which is rotationally fixedly connected to the first connection part, a second transmission element which is rotationally fixedly connected to the second connection part and a third transmission element which is rotationally fixedly connected to the primary disks, wherein the secondary disks are rotationally fixedly connected to one of the first connection part, to the second connection part or a stationary housing part;

an electric coil for the generation of a magnetic field which acts on a magnetorheological medium, with each of the primary disks and secondary disks being surrounded by the magnetorheological medium on at least two sides that define working spaces so that the electric coil, the magnetorheological medium and the primary disks and the secondary disks form a magnetorheological clutch; and wherein the planetary transmission is configured such that a rotational movement of the second connection part relative to the first connection part effects a speed increasing gear ratio with respect to the primary disks.

2. The torque transmission unit in accordance with claim 1, wherein each of the primary disks and secondary disks has a hollow cylindrical section which is arranged coaxially to an axis of rotation (A) of the first and second connection parts and which is surrounded by the magnetorheological medium at least two sides.

3. The torque transmission unit in accordance with claim 1, wherein each of the primary disks and secondary disks is configured as a pot disk which has a radial section and a hollow cylindrical axial section, wherein the radial section extends in the radial direction with respect to an axis of rotation (A) of the first and second connection parts, and wherein the hollow cylindrical axial section is adjacent to the radial section and is arranged coaxially to the axis of rotation (A), with the radial sections of at least the primary disks being directed radially inwardly.

4. The torque transmission unit in accordance with claim 3, wherein the working spaces for the magnetorheological medium are radially inwardly closed by means of a closure device extending in the axial direction adjacent to a transition region between the respective radial section and the respective axial section of the primary disks or of the secondary disks so that substantially cylindrical working spaces are formed in which the magnetorheological medium is received.

5. The torque transmission unit in accordance with claim 4, wherein the closure device is formed by at least one plastic ring which is injected molded at the radial sections of the primary disks or of the secondary disks.

6. The torque transmission unit in accordance with claim 4, wherein the radial sections of the primary disks or of the secondary disks are arranged adjacent to one another in the axial direction with respect to the axis of rotation (A), wherein a pair of sealing rings are arranged at a radially outer peripheral side of the closure device with one sealing ring on both sides of the axial arrangement of the radial sections of the primary disks or the secondary disks.

7. The torque transmission unit in accordance with claim 6, wherein the sealing rings are arranged radially inwardly offset with respect to the cylindrical working spaces for the magnetorheological medium.

8. The torque transmission unit in accordance with claim 4, wherein the radial sections of the primary disks are rotationally fixedly connected via a spline connection to the third transmission element of the planetary transmission and wherein the spline connection is provided radially inside the closure device.

9. The torque transmission unit in accordance with claim 1, wherein the planetary transmission is arranged in axial extension relative to the primary disks and the secondary disks with respect to an axis of rotation (A).

10. The torque transmission unit in accordance with claim 1, wherein the electric coil is arranged at the stationary housing part.

11. The torque transmission unit in accordance with claim 1, wherein the third transmission element is a sun gear.

12. The torque transmission unit in accordance with claim 11, wherein the primary disks have—with respect to an axis of rotation (A) of the first and second connector parts—a radial extent which is larger than the effective radius of the sun gear of the planetary transmission.

13. The torque transmission unit in accordance with claim 12, wherein the first transmission element is an annulus gear and wherein the second transmission element is a planet carrier with at least one planet gear meshing with the annulus gear and with the sun gear.

14. The torque transmission unit in accordance with claim 1, wherein a differential gear is associated with the torque transmission unit and its gear ratio is selected such that the primary disks are substantially stationary with the same speed of the primary axle and of the secondary axle of the motor vehicle.

15. The torque transmission unit in accordance with claim 1, wherein the first connection part is a rotatable drive shaft and the second connection part is a rotatable output shaft.

16. A torque transmission unit for a motor vehicle having a permanently driven primary axle and a secondary axle, comprising:
a first rotary part adapted for connection to a drive unit of the motor vehicle;
a second rotary part adapted for connection to the secondary axle and rotatable relative to the first rotary part;
a planetary transmission having a first element fixed for rotation with the first rotary part, a second element fixed for rotation with the second rotary part, and a third element; and
a magnetorheological clutch including a plurality of disks subdivided in an alternating arrangement into primary disks and secondary disks, a magnetorheological medium and an electric coil for generating a magnetic field which acts on the magnetorheological medium, wherein the primary disks are fixed for rotation with the third element, wherein the secondary disks are fixed for rotation with one of the first and second rotary parts or a stationary part, wherein each of the primary and secondary disks are surrounded by the magnetorheological medium on two sides which define working spaces therebetween, and wherein rotation of the second rotary part relative to the first rotary part effects a speed increase of the primary disks with the respect to the secondary disks.

17. The torque transmission unit of claim 16 wherein each of the primary and secondary disks is configured as a pot disk having a radial section and a cylindrical axial section, and wherein the working spaces for the magnetorheological medium are radially inwardly closed by a closure device located at the radial sections of at least one of the primary disks and the secondary disks.

18. The torque transmission unit of claim 16 wherein the first element is a planet carrier rotatably supporting at least one planet gear, wherein the second element is an annulus gear meshed with the planet gear, wherein the third element is a sun gear meshed with the planet gear, and wherein the sun gear is fixed for rotation with a hollow shaft journally supported on the first rotary part and to which the primary disks are connected.

19. The torque transmission unit of claim 16 wherein the first element is an annulus gear, wherein the second element is a planet carrier rotatably supporting at least one planet gear, wherein the third element is a sun gear such that the planet gear is meshed with the annulus gear and the sun gear, and wherein the sun gear is fixed for rotation with a hollow shaft journally supported on one of the first and second rotary parts and to which the primary disks are connected.

20. The torque transmission unit of claim 16 wherein a differential gear is associated with the secondary axle and its gear ratio is selected such that the primary disks are substantially stationary when the rotary speed of the first rotary part is the same as the second rotary part.

21. A torque transmission unit for a motor vehicle having a drive unit permanently driving a primary axle and a secondary axle, comprising:
a first rotary part adapted to be driven by the drive unit;
a second rotary part adapted for connection to the secondary axle;
a planetary transmission having a planet carrier driven by the first rotary part, an annulus gear driving the second rotary part, a sun gear, and a plurality of planet gears rotatably supported by the planet carrier and meshed with the annulus gear and the sun gear;
a hollow shaft surrounding a portion of the first rotary part and fixed for rotation with the sun gear; and
a magnetorheological clutch having primary disks coupled to the hollow shaft and which are alternatively arranged with secondary disks so as to define working spaces on at least two sides of each disk, a magnetorheological medium disposed within the working spaces, and an electric coil for generating a magnetic field which acts on the magnetorheological medium, wherein the secondary disks are fixed for rotation with one of the first and second rotary parts or a stationary part, and wherein rotational movement of the second rotary part relative to the first rotary part effects a speed increase of the primary disks with respect to the secondary disks.

22. The torque transmission unit of claim 21 wherein a differential gear is associated with the secondary axle and its gear ratio is selected such that the primary disks are substantially stationary when the rotary speed of the first rotary part is the same as the second rotary part.

* * * * *